United States Patent
Nakamura et al.

(10) Patent No.: US 12,112,893 B2
(45) Date of Patent: Oct. 8, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventors: Tomoaki Nakamura, Tokyo (JP); Mikio Tahara, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 24 days.

(21) Appl. No.: 17/860,946

(22) Filed: Jul. 8, 2022

(65) Prior Publication Data

US 2023/0043869 A1 Feb. 9, 2023

(30) Foreign Application Priority Data

Jul. 28, 2021 (JP) .................. 2021-123179

(51) Int. Cl.
*H01G 4/248* (2006.01)
*H01G 4/232* (2006.01)
*H01G 4/30* (2006.01)

(52) U.S. Cl.
CPC .......... *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 4,701,827 A | * | 10/1987 | Fujikawa | H01G 4/2325 361/309 |
| 11,581,140 B2 | * | 2/2023 | Nakamura | H01G 4/008 |
| 2011/0149470 A1 | * | 6/2011 | Hur | H01G 4/12 29/25.42 |
| 2015/0016018 A1 | * | 1/2015 | Onishi | H10N 30/872 310/365 |
| 2019/0051467 A1 | * | 2/2019 | Kimura | H01G 4/0085 |
| 2019/0318876 A1 | * | 10/2019 | Matsushita | H01G 4/012 |
| 2021/0151252 A1 | * | 5/2021 | Nakamura | H01G 4/008 |
| 2021/0202173 A1 | * | 7/2021 | Fujita | H01G 4/248 |
| 2023/0043869 A1 | * | 2/2023 | Nakamura | H01G 4/30 |

FOREIGN PATENT DOCUMENTS

JP 2011-135079 A 7/2011
JP 2016-171310 A 9/2016

* cited by examiner

*Primary Examiner* — Dion R. Ferguson
(74) *Attorney, Agent, or Firm* — Stein IP, LLC

(57) ABSTRACT

A ceramic electronic component includes a multilayer chip having a substantially rectangular parallelepiped shape and including dielectric layers and internal electrode layers that are alternately stacked, a main component of the dielectric layers being ceramic, a main component of the internal electrode layers being Ni, the internal electrode layers being alternately exposed to two end faces of the multilayer chip opposite to each other, and external electrodes, each of which is provided on each of the two end faces. Each of the external electrodes includes a base layer contacting the internal electrode layers, a main component of the base layer being Cu. The base layer includes Ni of 1 wt % or more and 10 wt % or less on a presumption that an amount of Cu is 100 wt %.

18 Claims, 12 Drawing Sheets

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-123179, filed on Jul. 28, 2021, the entire contents of which are incorporated herein by reference.

FIELD

A certain aspect of the present disclosure relates to a ceramic electronic device and a manufacturing method of the ceramic electronic device.

BACKGROUND

In order to downsize multilayer ceramic capacitors and enlarge a capacity of the multilayer ceramic capacitors, thicknesses of internal electrode layers and dielectric layers are reduced, the number of the internal electrode layers and the dielectric layers is enlarged, and thicknesses of margin portions are reduced.

SUMMARY OF THE INVENTION

According to an aspect of the embodiments, there is provided a ceramic electronic device including: a multilayer chip having a substantially rectangular parallelepiped shape and including dielectric layers and internal electrode layers that are alternately stacked, a main component of the dielectric layers being ceramic, a main component of the internal electrode layers being Ni, the internal electrode layers being alternately exposed to two end faces of the multilayer chip opposite to each other; and external electrodes, each of which is provided on each of the two end faces, wherein each of the external electrodes includes a base layer contacting the internal electrode layers, a main component of the base layer being Cu, and wherein the base layer includes Ni of 1 wt % or more and 10 wt % or less on a presumption that an amount of Cu is 100 wt %.

According to another aspect of the embodiments, there is provided a manufacturing method of a ceramic electronic device including: preparing a ceramic multilayer structure having a substantially rectangular parallelepiped shape in which dielectric green sheets including a main component ceramic and metal conductive pastes for internal electrode layers including Ni as a main component metal are alternately stacked, the metal conductive pastes being alternately exposed to two end faces of the ceramic multilayer structure opposite to each other; forming a multilayer chip by firing the ceramic multilayer structure; providing metal conductive pastes for base layers contacting the two end faces, a main component metal of the metal conductive paste for base layers being Cu powder, an amount of Ni powder of the metal conductive paste for base layers being 1 wt % or more and 10 wt % or less on a presumption that an amount of Cu is 100 wt %; and firing the metal conductive pastes for base layers.

DETAILED DESCRIPTION

However, when the cover layer is made thinner while increasing the number of layers, cracks may occur in a portion where the cover layer, a side margin, and an end margin overlap during firing an external electrode. This occurs based on the following mechanism. The internal electrode layer and the external electrode react at the time of firing. Cu, which is a metal component of the external electrode, diffuses to a Ni side of the internal electrode layer, and the internal electrode layer expands. Due to the expansion of the internal electrode layer, an outward stress is generated in the margin, and the cracks are generated due to the stress. In order to suppress the phenomenon, it is known that the Cu diffusion length may be suppressed (see, for example, Japanese Patent Application Publication No. 2011-135079). As a means for suppressing Cu diffusion, a method of lowering a firing temperature is generally known (see, for example, Japanese Patent Application Publication No. 2016-171310).

However, when the firing temperature is lowered to a temperature range where cracks do not occur, a density of the external electrode may decrease and long-term reliability may not be necessarily ensured, or the fixing strength of the external electrode may decrease, which may cause mounting problems. Therefore, it is conceivable to increase an amount of glass in a base layer or to make Cu powder finer. However, when the amount of glass is increased, the glass floats in the base layer, causing discontinuity in a plated layer, and cracks occur at corners. Further, when the Cu powder is miniaturized, the reactivity becomes high, so that there is a problem that sintering proceeds rapidly and blister may be generated.

Hereinafter, an exemplary embodiment will be described with reference to the accompanying drawings.

Exemplary Embodiment

Figure 1:
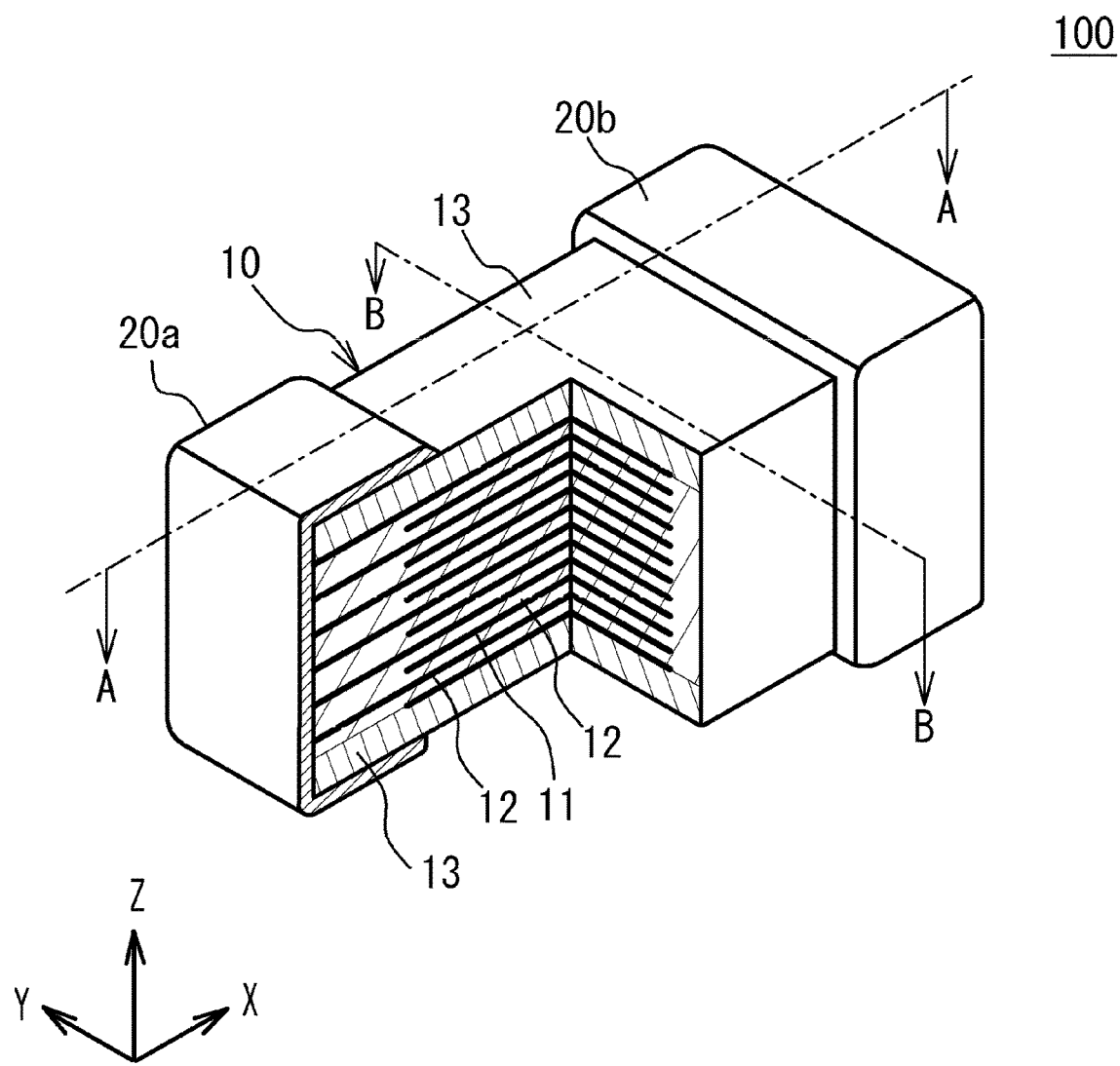
FIG. 1 is a partial cross-sectional perspective view of a multilayer ceramic capacitor.
Figure 2:
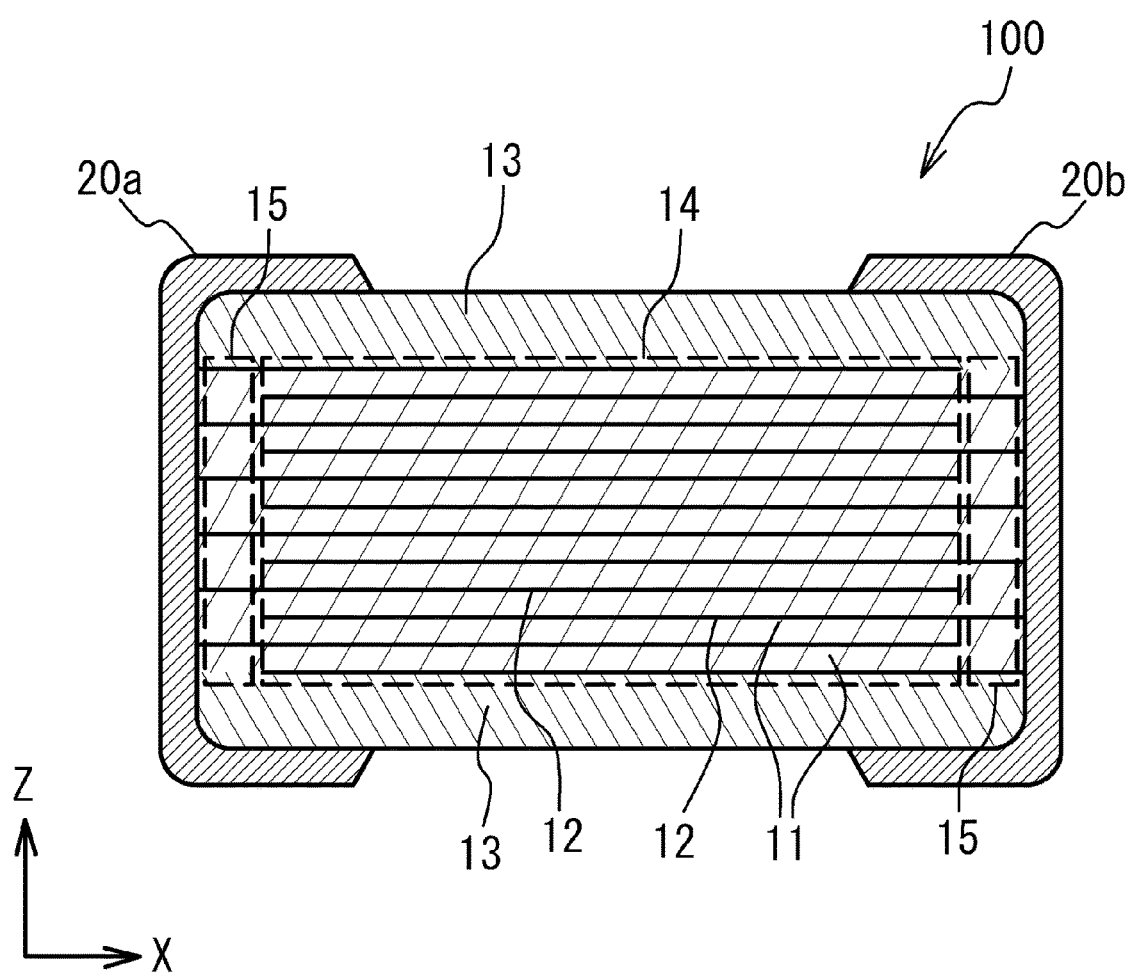
FIG. 2 is a cross-sectional view taken along line A-A in FIG. 1.
Figure 3:
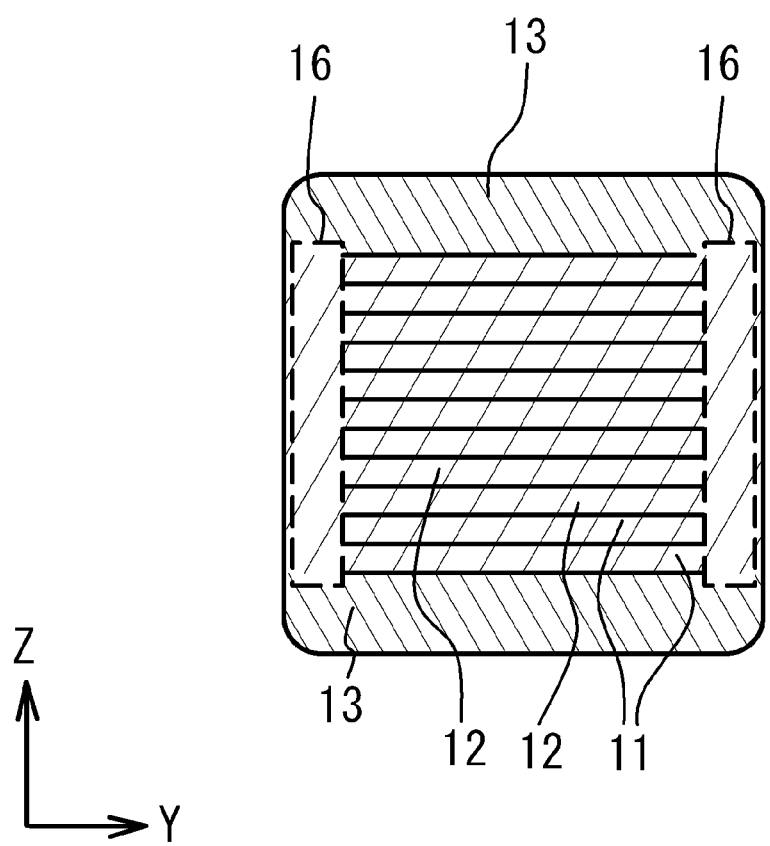
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11. Each thickness of the cover layer 13 may be 10 μm or more and 30 μm or less, 30 μm or more and 50 μm or less, or 50 μm or more and 100 μm or less.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the internal electrode layer 12 is nickel (Ni). Each thickness of the internal electrode layers 12 may be 0.1 μm or more and 0.5 μm or less, 0.5 μm or more and 1.0 μm or less, or 1.0 μm or more and 5.0 μm or less. The number of the internal electrode layers 12 may be 100 or more and 200 or less, 200 or more and 500 or less, or 500 or more and 1000 or less.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like. Each thickness of the dielectric layers 11 may be 0.1 μm or more and 0.5 μm or less, 0.5 μm or more and 1.0 μm or less, or 1.0 μm or more and 5.0 μm or less.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated. Each thickness of the end margins 15 in the X-axis direction may be 10 μm or more and 30 μm or less, 30 μm or more and 50 μm or less, or 50 μm or more and 100 μm or less As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated. Each thickness of the side margins 16 in the Y-axis direction may be 10 μm or more and 30 μm or less, 30 μm or more and 50 μm or less, or 50 μm or more and 100 μm or less.

Figure 4:
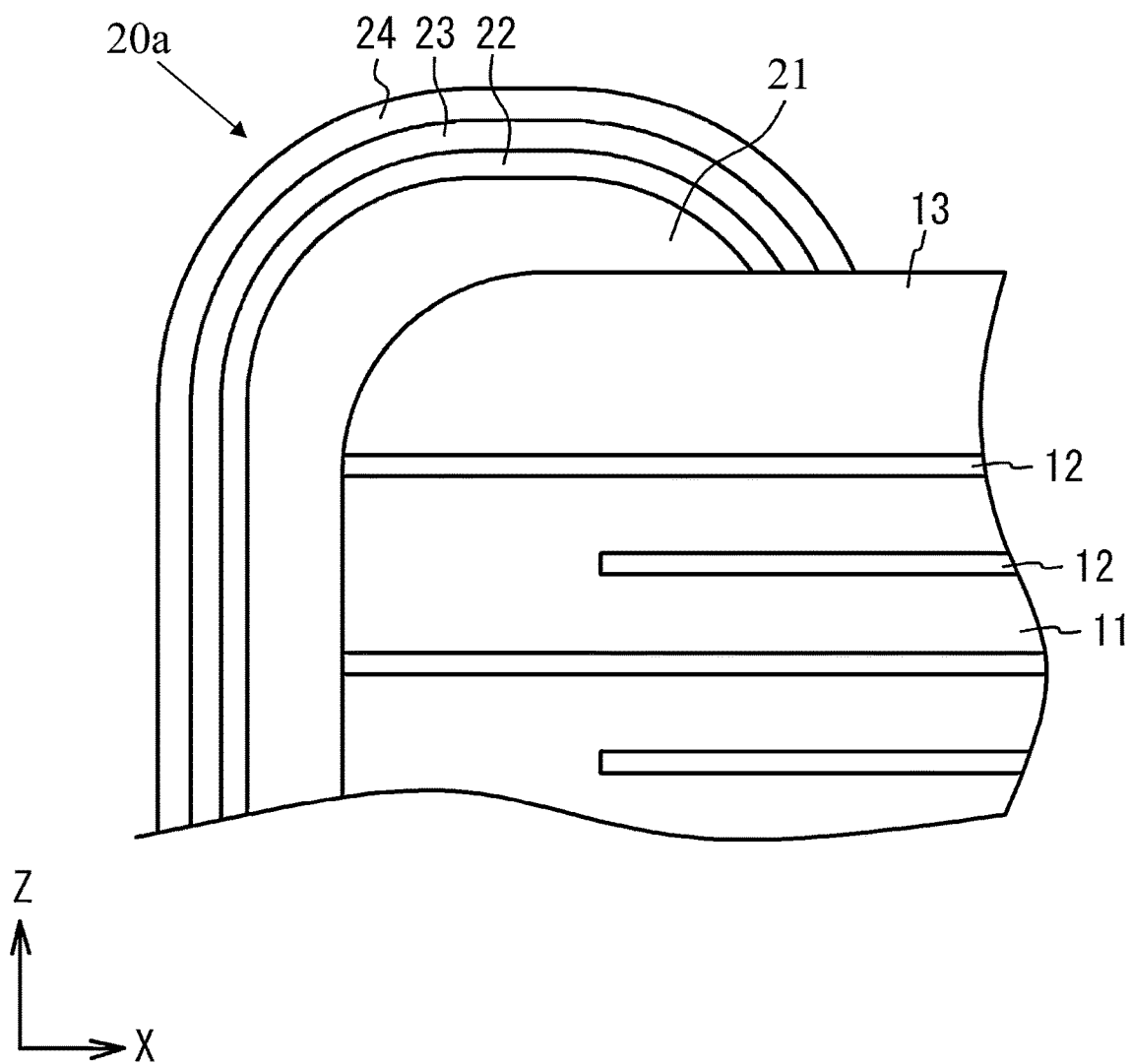
FIG. 4 illustrates a cross-sectional view of an external electrode, and is a partial cross-sectional view taken along a line A-A of FIG. 1.

FIG. 4 is a cross-sectional view of the external electrode 20a, and is a partial cross-sectional view taken along the line A-A of FIG. In FIG. 4, the hatch representing the cross section is omitted. As illustrated in FIG. 4, the external electrode 20a has a structure in which a plated layer is formed on a base layer 21. The plated layer has a structure in which, for example, a copper (Cu)-plated layer 22, a Ni plated layer 23, and a tin (Sn)-plated layer 24 are formed in this order from the base layer 21. The base layer 21 contains Cu as a main component. On the two end faces of the multilayer chip 10, the thickness of the base layer 21 in the X-axis direction is, for example, 10 μm or more and 30 μm or less, 30 μm or more and 50 μm or less, or 50 μm or more and 100 μm or less. The base layer 21, the Cu-plated layer 22, the Ni-plated layer 23, and the Sn-plated layer 24 extend from both end faces of the multilayer chip 10 to the upper surface, the lower surface, and the two side surfaces in the stacking direction. Although the external electrode 20a is illustrated in FIG. 4, the external electrode 20b also has the same multilayer structure.

Figure 5:
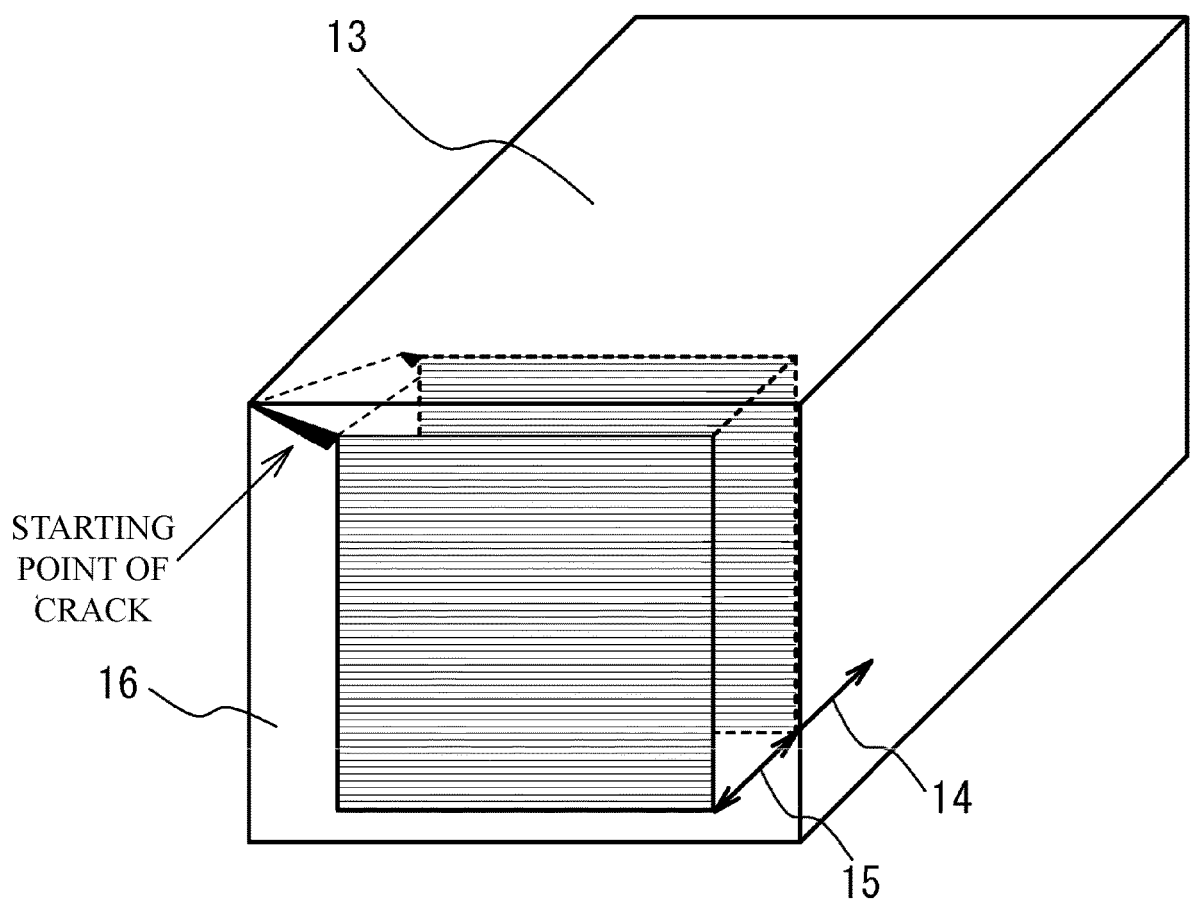
FIG. 5 illustrates cracks.

In order to reduce the size and enlarge the capacity of the multilayer ceramic capacitor 100, thinning and high stacking of each layer and thinning of the margins are being promoted. However, when the number of layers is increased and the cover layer 13 is made thinner, cracks illustrated in FIG. 5 may occur in the portion where the cover layer 13, the end margin 15 and the side margin 16 overlap with each other during firing the base layer 21 of the external electrode. This may occur based on the following mechanism. The internal electrode layer 12 and the base layer 21 react with each other when the base layer 21 is fired. Cu, which is a metal component of the base layer 21, diffuses to the Ni side of the internal electrode layer 12, and the internal electrode layer 12 expands. Due to the expansion of the internal electrode layer 12, an outward stress is generated in the margins, and the stress cannot be withstood and cracks are generated.

Figure 6A:
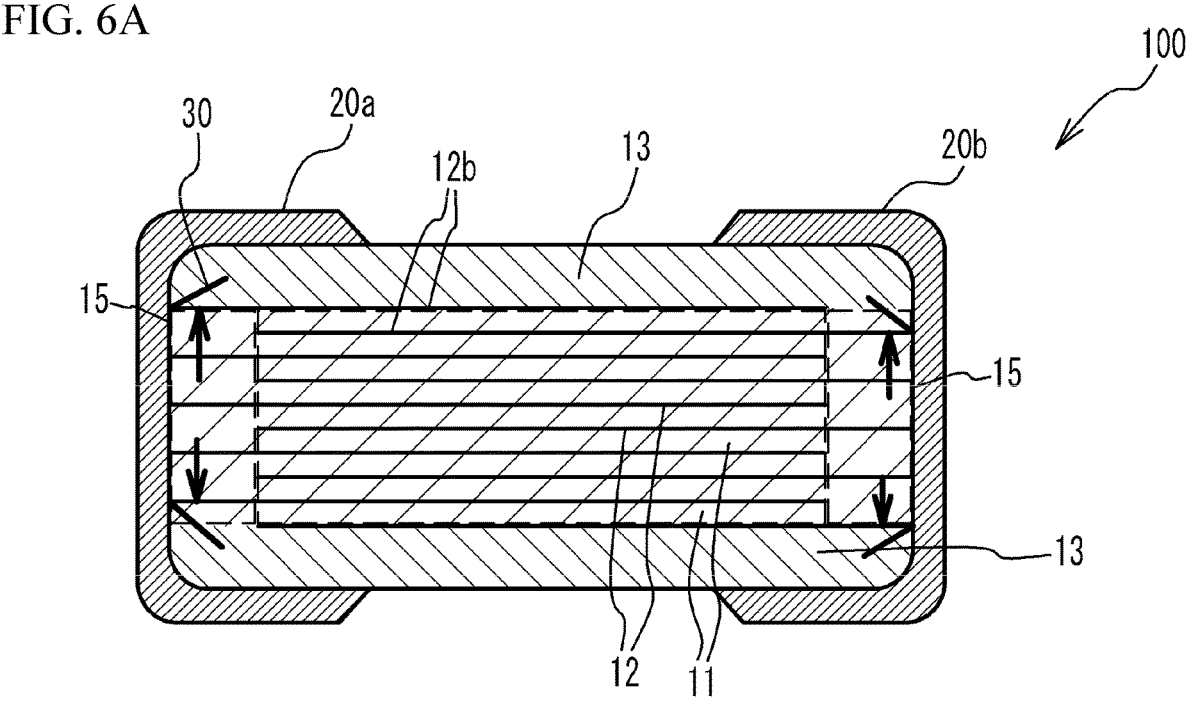
FIG. 6A and FIG. 6B illustrate stress.
Figure 6B:
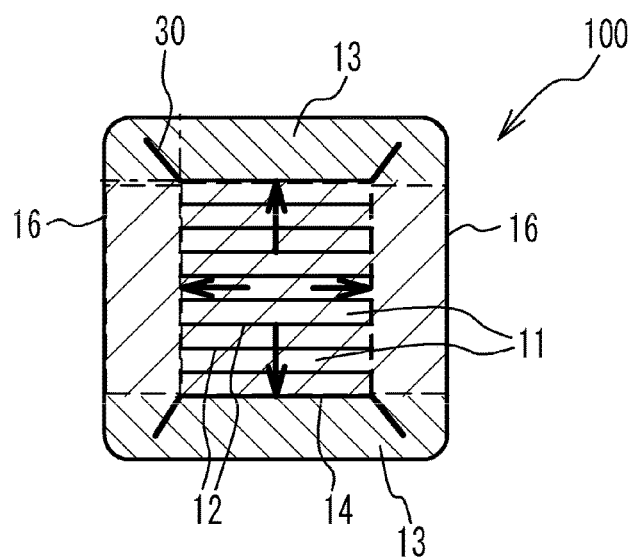

FIG. 6A and FIG. 6B are diagrams illustrating the direction of stress caused by the expansion of the internal electrode layer 12. In addition, FIG. 6A and FIG. 6B illustrate the crack. As illustrated in FIG. 6A and FIG. 6B, outward stress is generated in the side margin 16 and the end margin 15 as indicated by arrows. And it is considered that a crack 30 is generated in the portion where the cover layer 13, the side margin 16, and the end margin 15 overlap with each other.

Figure 7:
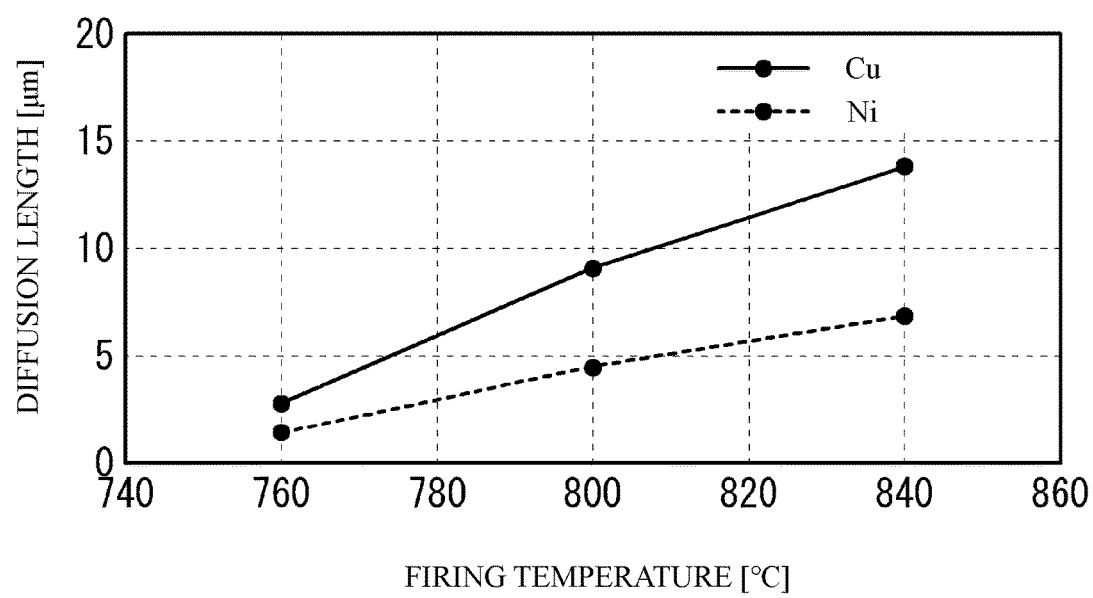
FIG. 7 is a diagram illustrating a relationship between a firing temperature and diffusion lengths of Cu and Ni.

FIG. 7 is a diagram illustrating the relationship between the firing temperature (atmospheric temperature) at the time of firing the base layer 21 and the diffusion length of Cu into the internal electrode layer 12 and the diffusion length of Ni into the base layer 21. As illustrated in FIG. 7, it can be seen that the diffusion length of Cu is larger than the diffusion length of Ni. Further, it can be seen that the higher the firing temperature is, the larger the diffusion length of Cu is. From these results, it can be seen that the firing temperature should be lowered in order to shorten the diffusion length of Cu.

Figure 8:
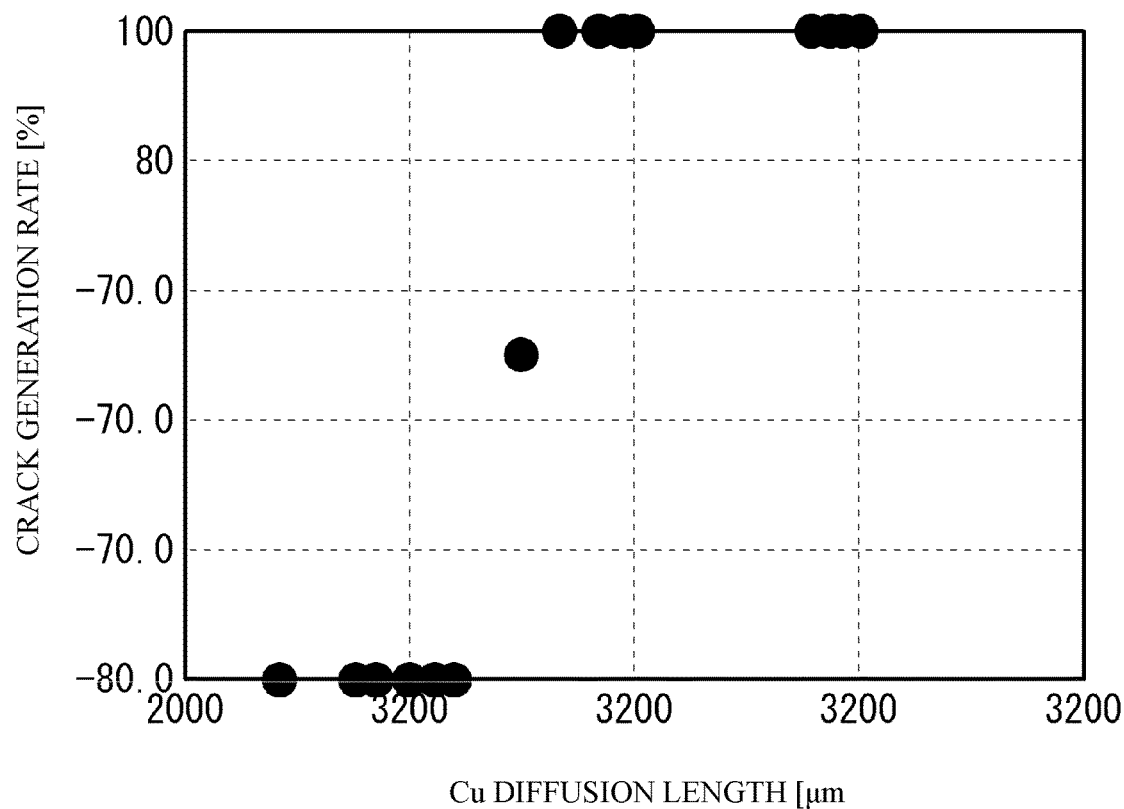
FIG. 8 is a diagram illustrating a relationship between a diffusion length of Cu and a crack generation rate.

FIG. 8 is a diagram illustrating the relationship between the diffusion length of Cu and the crack generation rate. As illustrated in FIG. 8, it can be seen that the crack generation rate can be reduced by reducing the diffusion length of Cu. However, when an attempt is made to lower the firing temperature to a temperature range where the crack does not occur, the density of the base layer 21 may decrease and the long-term reliability may not be necessarily ensured. Alternatively, the adhesion strength of the base layer 21 may decrease, which may cause a problem in mounting the multilayer ceramic capacitor.

Therefore, in order to improve the density of the base layer 21, it is conceivable to increase the amount of glass in the base layer 21 or to make the Cu powder used for the metal paste before firing finer. However, even if the amount of glass can be simply increased to ensure the density, the glass floats in the base layer 21 and discontinuity may occur in a plated layer, and the crack occurs at the corners of the YZ plane. Cracking occurs when glass is used, and means that the Cu particles in the thin corners are pulled by the Cu particles in the thick portions and appear to be cracked. These problems become remarkable when the base layer 21 is thinned in order to secure the effective volume of the main body in order to reduce the size and increase capacity. Next, when the Cu powder is miniaturized, the reactivity becomes high, so that sintering proceeds rapidly, and there is a problem that blister is generated. In this way, when the firing temperature is simply lowered, the trade-off relationship described above occurs. It is not possible to secure design points that satisfy all the characteristics. And there is a problem that the initial problem of the crack cannot be solved.

Therefore, the multilayer ceramic capacitor 100 according to the present embodiment has a configuration capable of suppressing the diffusion of Cu and suppressing the generation of the crack without lowering the firing temperature of the base layer 21. The details will be described below.

In the present embodiment, the base layer 21 contains Ni, which is the main component metal of the internal electrode layer 12, in addition to Cu. Since the base layer 21 contains Ni, the difference in Cu concentration, which is the driving force for the diffusion of Cu, can be reduced between the internal electrode layer 12 and the base layer 21. As a result, the diffusion of Cu into the internal electrode layer 12 can be suppressed and the generation of the crack can be suppressed without lowering the firing temperature of the base layer 21. However, when the Ni content in the base layer 21 is too small, the difference in Cu concentration between the internal electrode layer 12 and the base layer 21 may not be necessarily reduced sufficiently. Therefore, a lower limit is set for the Ni content in the base layer 21. Specifically, in the base layer 21, the Ni amount is 1 wt % or more, on a presumption that the Cu amount is 100 wt %, On the other hand, when the amount of Ni in the base layer 21 is too large, there is a risk of insufficient density. Therefore, an upper limit is set for the Ni content in the base layer 21. Specifically, in the base layer 21, the Ni amount is 10 wt % or less, on a presumption that the Cu amount is 100 wt %, From a viewpoint of sufficiently reducing the difference of the Cu concentration between the internal electrode layer 12 and the base layer 21, it is preferable that the amount of Ni in the base layer 21 is 3 wt % or more on a presumption that the amount of Cu is 100 wt %. It is more preferable that the amount of Ni is 5 wt % or more.

On the other hand, from a viewpoint of suppressing lacking of the density degree, it is preferable that the amount of Ni in the base layer 21 is 7 wt % or less on a presumption that the amount of Cu is 100 wt %.

Although the diffusion length of Cu from the base layer 21 to the internal electrode layer 12 can be reduced, it is possible that a slight amount of Cu diffuses. In this case, a concentration gradient in which the Cu concentration decreases from the base layer 21 toward the internal electrode layer 12 is formed in the vicinity of the interface between the base layer 21 and the internal electrode layer 12.

For the purpose of improving the density of the base layer 21, the base layer 21 preferably contains a glass component. Examples of the glass component include $BaO$—$B_2O_3$—$ZnO$-based material, $SiO_2$—$ZnO$—$CaO$-based material, $SiO_2$—$BaO$—$ZnO$-based material, and the like.

When the amount of the glass component in the base layer 21 is too small, sufficient density of the base layer 21 may not be necessarily achieved. Therefore, it is preferable to set a lower limit for the amount of glass component in the base layer 21. For example, in the base layer 21, the amount of the glass component is preferably 7 weight parts or more, and more preferably 10 weight parts or more with respect to Cu, which is a metal component constituting the base layer 21.

On the other hand, if the amount of the glass component in the base layer 21 is too large, there is a risk of fusion, glass floating, poor plating, and the like. Therefore, it is preferable to set an upper limit on the amount of glass component in the base layer 21. For example, in the base layer 21, the amount of the glass component is preferably 13 weight parts or less, and more preferably 10 weight parts or less with respect to Cu, which is a metal component constituting the base layer 21.

When the base layer 21 contains Ni and a glass component containing zinc (Zn), an oxide containing Ni and Zn is formed in the process of firing the base layer 21. In this case, the amount of excess glass component is reduced when the firing is completed. Therefore, the amount of excess glass component discharged to the surface of the base layer 21 is reduced. It is considered that this makes it possible to suppress fusion.

In the base layer 21, the average particle diameter of the oxide containing Ni and Zn is, for example, 1 μm or less, and is around 0.5 μm. As described above, the oxide containing Ni and Zn has a small size.

Figure 9:
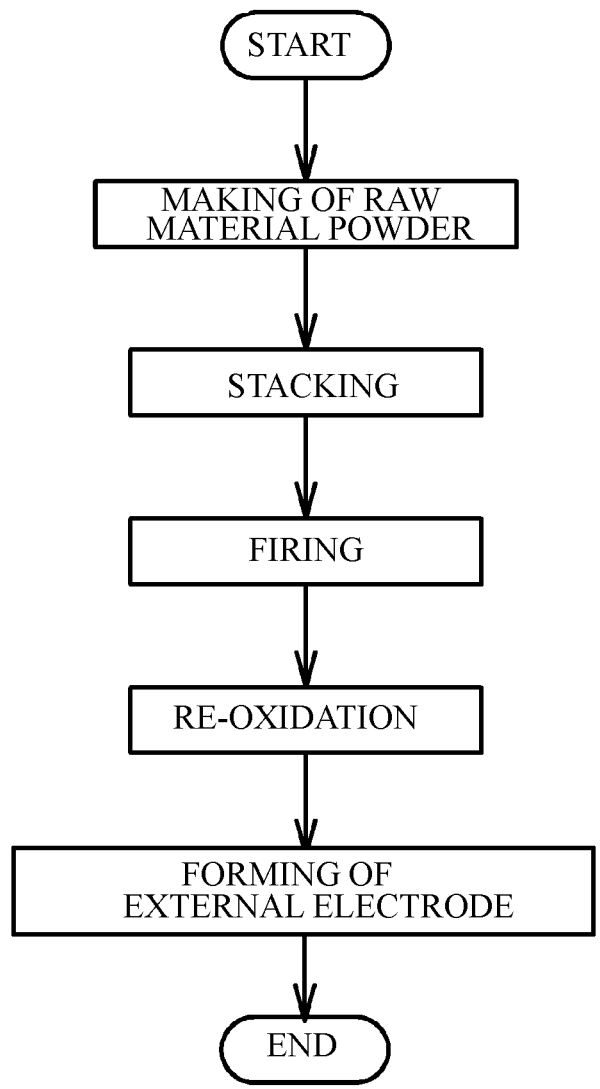
FIG. 9 illustrates a flow of a manufacturing method of a multilayer ceramic capacitor.

Next, the manufacturing method of the multilayer ceramic capacitor 100 will be described. FIG. 9 is a flowchart of the manufacturing method of the multilayer ceramic capacitor 100.

[Making of Raw Material Powder]

A dielectric material for forming the dielectric layer 11 is prepared. The dielectric material includes the main component of the dielectric layer 11. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium), or Yb (ytterbium)) or an oxide of Co (cobalt), Ni (nickel), Li (lithium), B (boron), Na (sodium), K (potassium) or Si (silicon), or glass including cobalt, nickel, lithium, boron, sodium, potassium or silicon.

[Stacking Process]

Next, a binder such as polyvinyl butyral (PVB) resin, an organic solvent such as ethanol or toluene, and a plasticizer are added to the resulting dielectric material and wet-blended. With use of the resulting slurry, a dielectric green sheet 51 is painted on a base material by, for example, a die coater method or a doctor blade method, and then dried.

Figure 10A:
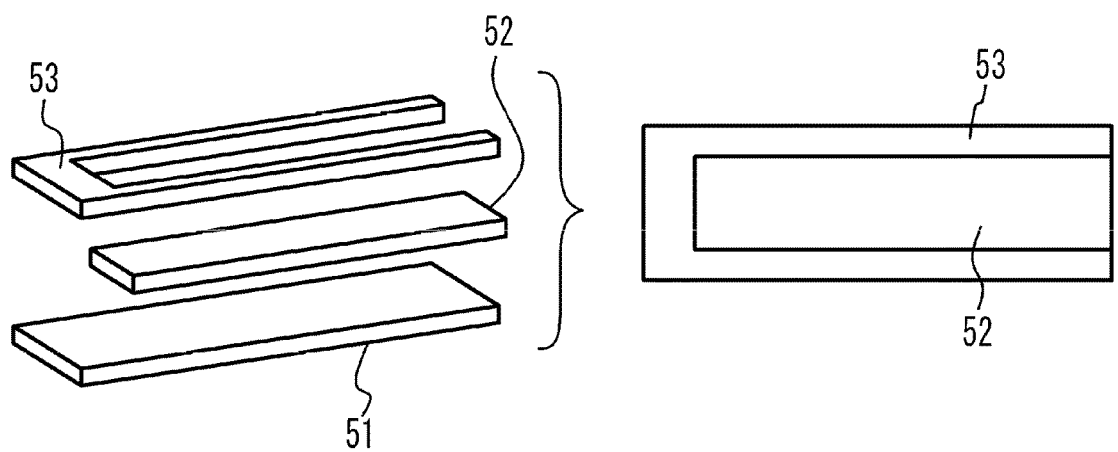
FIG. 10A and FIG. 10B illustrate a sacking process.

Next, as illustrated in FIG. 10A, an internal electrode pattern 52 is formed on the surface of the dielectric green sheet 51 by printing a metal conductive paste for forming the internal electrode with use of screen printing or gravure printing. The metal conductive paste for forming the internal electrode contains an organic binder. The metal conductive paste includes Ni powder. Ceramic particles are added as a co-material to the metal conductive paste. The main component of the ceramic particles is not particularly limited, but is preferably the same as the main component ceramic of the dielectric layer 11.

Next, as illustrated in FIG. 10A, a reverse pattern 53 is formed by printing the reverse pattern paste in the peripheral region, where the internal electrode pattern 52 is not printed, on the dielectric green sheet 51 to cause the reverse pattern 53 and the internal electrode pattern 52 to form a flat surface. The components of the reverse pattern paste may be the same as those of the dielectric green sheet 51. An additive of the reverse pattern paste may be different from that of the dielectric green sheet 51. The dielectric green sheet 51 on which the internal electrode pattern 52 and the reverse pattern 53 are printed is referred to as a stack unit.

Figure 10B:
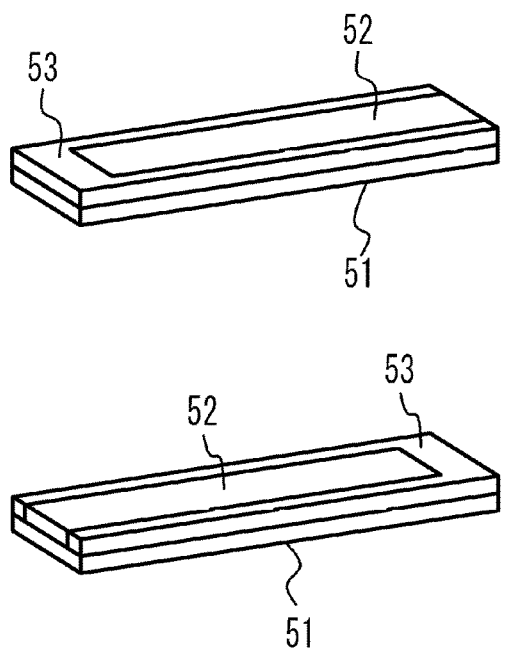

Thereafter, a predetermined number of the stack units are stacked so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations as illustrated in FIG. 10B. For example, 2 to 10 stack units are stacked.

Figure 11:
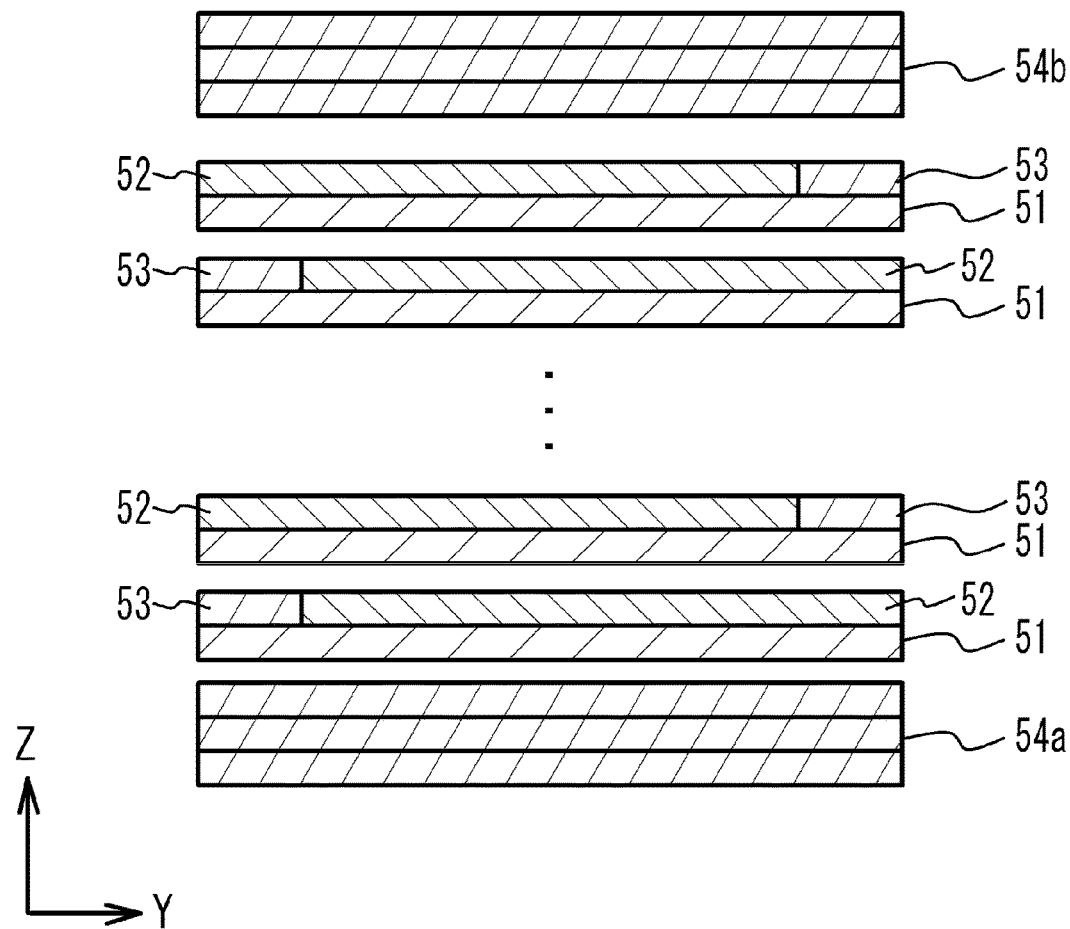
FIG. 11 is a diagram illustrating a multilayer cross section.

Next, a predetermined number (for example, 2 to 10) cover sheet are stacked on the stacked stack units and under the stacked stack units. After that, the stacked structure is crimped. The resulting stacked structure is stamped into a predetermined size (for example, 1.0 mm×0.5 mm). FIG. 11 is a diagram illustrating a multilayer cross section. As illustrated in FIG. 11, the dielectric green sheets 51 on which the internal electrode pattern 52 and the reverse pattern 53 are printed are stacked on lower cover sheets 54a which will become the cover layer 13 on the lower surface side after firing. Upper cover sheets 54b that will become the cover layer 13 on the upper surface side after firing are stacked on the upper surface. The lower cover sheet 54a and the upper cover sheet 54b may have the same components as the dielectric green sheet 51, and the added compounds and the like may be different from each other.

Figure 12:
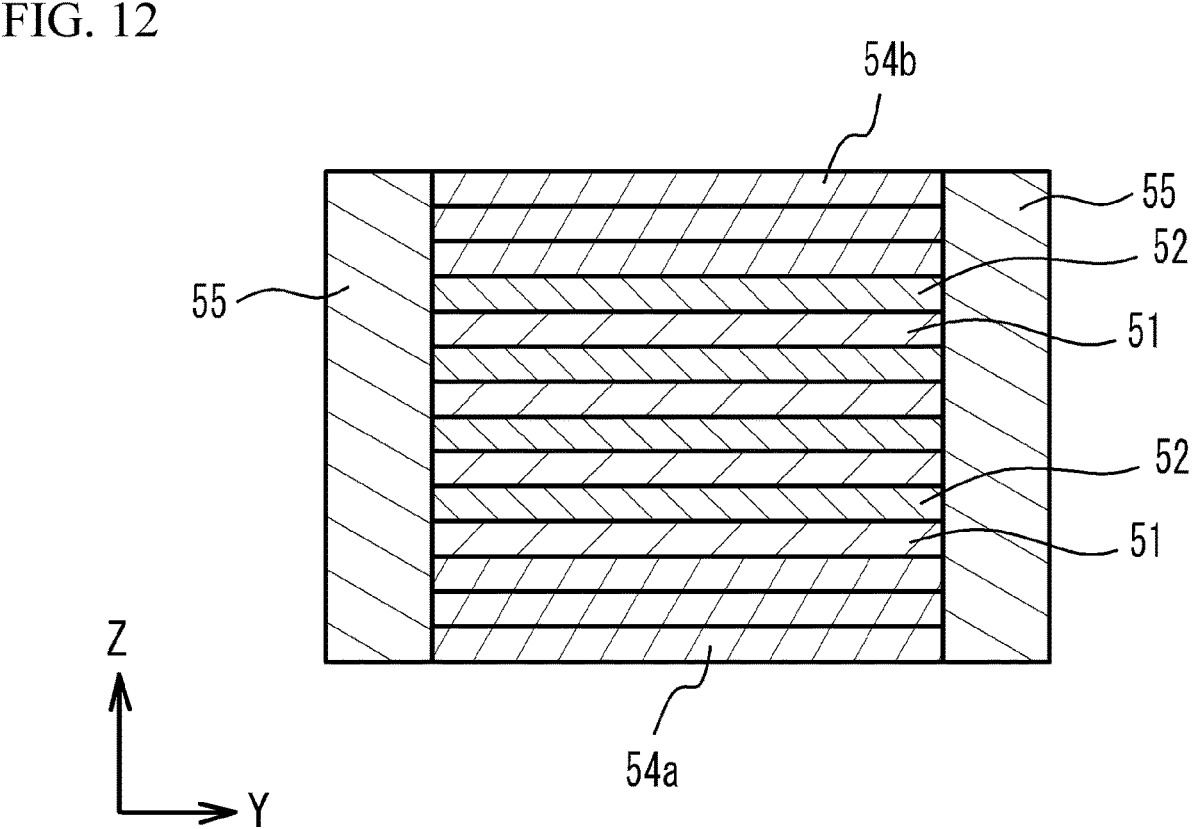
FIG. 12 is a diagram illustrating a multilayer cross section.

It is not always necessary to form the reverse pattern 53 on the dielectric green sheet 51. The stacked portion of the reverse patterns 53 may be attached after stacking. Specifically, as illustrated in FIG. 12, the dielectric green sheet 51 and the internal electrode pattern 52 having the same width as the dielectric green sheet 51 are alternately stacked to obtain a multilayer structure. Next, each of side margin sheets 55 is attached to each of the side surfaces of the multilayer structure. The side margin sheet 55 may have the same components as the dielectric green sheet 51. The added compounds and the like of the side margin sheet 55 may be different from that of the dielectric green sheet 51.

[Firing Process]

The binder is removed from the resulting ceramic multilayer structure in $N_2$ atmosphere. The resulting ceramic multilayer structure is fired in a reducing atmosphere with an oxygen partial pressure of $10^{-5}$ to $10^{-8}$ atm in a temperature range of 1100° C. to 1300° C. for 10 minutes to 2 hours. Thus, the multilayer chip 10 is formed.

[Re-Oxidation Process]

After that, the multilayer chip 10 may be subjected to a re-oxidation process in a temperature range of 600 degrees C. to 1000 degrees C. in $N_2$ gas atmosphere.

(External electrode forming process) A metal conductive paste for forming a base layer containing a metal powder, a glass frit, a binder, and a solvent is applied to both end faces of the multilayer chip 10 and dried. The metal powder contains Ni powder in addition to Cu powder. When the Cu amount is 100 wt %, the Ni amount is 1 wt % or more and 10 wt % or less. Then, the metal paste for forming the base layer is fired. As a result, the base layer 21 is formed. The binder and solvent evaporate by the firing. After that, the Cu-plated layer 22, the Ni-plated layer 23, and the Sn-plated layer 24 are formed on the base layer 21 by plating. The firing temperature is preferably 780 degrees C. or higher and 860 degrees C. or lower, and more preferably 800 degrees C. or higher and 840 degrees C. or lower.

According to the manufacturing method according to the present embodiment, since Ni powder is added to the metal conductive paste for forming the base layer, the Cu concentration difference that is the driving force for diffusion between the internal electrode layer 12 and the base layer 21 can be made smaller. As a result, the diffusion of Cu into the internal electrode layer 12 can be suppressed and the generation of the crack can be suppressed without lowering the firing temperature of the base layer 21. In the metal conductive paste for forming the base layer, when the Cu amount is 100 wt % and the Ni amount is 1 wt % or more, the Cu concentration difference can be sufficiently reduced. When the amount of Cu is 100 wt % and the amount of Ni is 10 wt % or less, the densification can be sufficiently improved.

From a viewpoint of sufficiently reducing the difference of the Cu concentration between the internal electrode layer 12 and the base layer 21, it is preferable that the amount of Ni in the metal conductive paste for the base layer 21 is 3 wt % or more on a presumption that the amount of Cu is 100 wt %. It is more preferable that the amount of Ni is 5 wt % or more.

On the other hand, from a viewpoint of suppressing lacking of the density degree, it is preferable that the amount of Ni in the metal conductive paste for the base layer is 7 wt % or less on a presumption that the amount of Cu is 100 wt %.

For the purpose of improving the density of the base layer 21, it is preferable to add a glass component to the metal conductive paste for forming the base layer. Examples of the glass component include BaO—$B_2O_3$—ZnO-based material, $SiO_2$—ZnO—CaO-based material, $SiO_2$—BaO—ZnO-based material, and the like.

When the amount of the glass component in the metal conductive paste for forming the base layer is too small, sufficient density of the base layer 21 may not be necessarily achieved. Therefore, it is preferable to set a lower limit on the amount of glass component in the metal conductive paste for forming the base layer. For example, in the metal conductive paste for forming the base layer, the amount of the glass component is preferably 7 weight parts or more, and more preferably 10 weight parts or more with respect to metal components in the metal conductive paste.

On the other hand, when the amount of glass component in the metal conductive paste for forming the base layer is too large, there is a risk of fusion, glass floating, plating defects, or the like. Therefore, it is preferable to set an upper limit on the amount of glass component in the metal conductive paste for forming the base layer. For example, in the metal conductive paste for forming the base layer, the amount of the glass component is preferably 13 weight parts or less, and more preferably 10 weight parts or less with respect to metal components in the metal conductive paste.

When the metal conductive paste for forming the base layer contains Ni and a glass component containing Zn, an oxide containing Ni and Zn is formed in the process of firing the base layer 21. Therefore, when the firing is completed, the amount of excess glass component is reduced. In this case, the amount of excess glass component discharged to the surface of the base layer 21 is reduced. It is considered that this makes it possible to suppress fusion.

When the average particle diameter of the Ni powder in the metal conductive paste for forming the base layer is too large, the contact probability between the Ni powder and the glass component decreases, and the amount of oxide containing Ni and Zn may decrease. Therefore, in the metal conductive paste for forming the base layer, it is preferable to set an upper limit on the average particle diameter of the Ni powder. For example, in the metal paste for forming the base layer, the average particle size of the Ni powder is preferably 5 μm or less, and more preferably 1 μm or less.

On the other hand, in the metal conductive paste for forming the base layer, when the average particle diameter of the Ni powder is too small, the Ni powder tends to aggregate during the paste preparation, and it may be difficult to uniformly add the Ni powder. Therefore, in the metal conductive paste for forming the base layer, it is preferable to set a lower limit for the average particle diameter of the Ni powder. For example, in the metal paste for forming the base layer, the average particle diameter of the Ni powder is preferably 0.1 μm or more, and more preferably 0.5 μm or more.

In the metal conductive paste for forming the base layer, when the average particle diameter of the Cu powder is too large, there is a risk of insufficient density. Therefore, in the metal conductive paste for forming the base layer, it is preferable to set an upper limit on the average particle diameter of the Cu powder. For example, in the metal paste for forming the base layer, the average particle diameter of the Cu powder is preferably 10 μm or less, and more preferably 5 μm or less.

On the other hand, in the metal conductive paste for forming the base layer, when the average particle diameter of the Cu powder is too small, blister may occur. Therefore, in the metal conductive paste for forming the base layer, it is preferable to set a lower limit for the average particle diameter of the Cu powder. For example, in the metal paste for forming the base layer, the average particle diameter of the Cu powder is preferably 0.5 μm or more, and more preferably 1 μm or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Example

Hereinafter, the multilayer ceramic capacitor according to the embodiment was manufactured and its characteristics were investigated.

(Example 1) Additives were added to barium titanate powder, and the mixture was sufficiently wet-mixed and pulverized with a ball mill to obtain a dielectric material. Additives were added to the barium titanate powder, and the mixture was sufficiently wet-mixed and pulverized with a ball mill to obtain a cover material.

A binder such as polyvinyl butyral (PVB) resin, an organic solvent such as ethanol and toluene, and a plasticizer were added to the cover material and wet-mixed. Using the obtained slurry, a cover sheet was applied onto the base material and dried.

A binder such as polyvinyl butyral (PVB) resin, an organic solvent such as ethanol and toluene, and a plasticizer were added to the dielectric material and wet-mixed. Using the obtained slurry, a dielectric green sheet was applied onto the substrate and dried. On the obtained dielectric green sheet, an electrode pattern of a metal conductive paste for forming an internal electrode containing Ni as a main component metal was printed.

40 layers of the cover sheet were stacked. The dielectric green sheet on which the electrode pattern was printed was peeled off from the base material. 500 layers of the dielectric green sheet were stacked so that the electrode patterns were alternately shifted. And 40 layers of the cover sheet were stacked and pressure-bonded. It was cut into a predetermined shape and fired in a reducing atmosphere to obtain multilayer chips.

Next, metal conductive paste for forming a base layer containing metal powder, a glass frit, a binder, and a solvent was applied to both end faces of the multilayer chip and dried. The metal powder contained Ni powder in addition to Cu powder. The average particle diameter of the Ni powder was 0.6 μm. The average particle diameter of the Cu powder was around 3 μm. When the Cu amount was 100 wt %, the Ni amount was 1 wt %. Further, 7 weight parts of glass was added to the metal conductive paste with respect to metal components of the base layer. A $BaO$—$B_2O_3$—$ZnO$-based material was used as the glass material. Then, the metal conductive paste for forming the base layer was fired to form the base layer. The firing temperature was 800 degrees C. The firing time was 10 minutes. The thickness of the base layer after firing was 25 μm. Then, by plating, a Cu-plated layer, a Ni-plated layer and a Sn-plated layer were formed on the base layer.

(Example 2) In an example 2, the amount of Ni was 5 wt % in the metal conductive paste for the base layer on a presumption that the amount of Cu was 100 wt %. Other conditions were the same as those of the example 1.

(Example 3) In an example 3, the amount of Ni was 5 wt % in the metal conductive paste for the base layer on a presumption that the amount of Cu was 100 wt %. The amount of glass in the metal conductive paste was 10 weight parts. Other conditions were the same as those of the example 1.

(Example 4) In an example 4, the amount of Ni was 5 wt % in the metal conductive paste for the base layer on a presumption that the amount of Cu was 100 wt %. The amount of glass in the metal conductive paste was 13 weight parts. Other conditions were the same as those of the example 1.

(Example 5) In an example 5, the amount of Ni was 10 wt % in the metal conductive paste for the base layer on a presumption that the amount of Cu was 100 wt %. Other conditions were the same as those of the example 1.

(Example 6) In an example 6, the amount of Ni was 10 wt % in the metal conductive paste for the base layer on a presumption that the amount of Cu was 100 wt %. The amount of glass in the metal conductive paste was 10 weight parts. Other conditions were the same as those of the example 1.

(Example 7) In an example 7, the amount of Ni was 10 wt % in the metal conductive paste for the base layer on a presumption that the amount of Cu was 100 wt %. The amount of glass in the metal conductive paste was 13 weight parts. Other conditions were the same as those of the example 1.

(Example 8) In an example 8, the average particle diameter of the Ni powder was 0.1 μm in the metal conductive paste. The amount of Ni was 5 wt % in the metal conductive paste for the base layer on a presumption that the amount of Cu was 100 wt %. The amount of glass in the metal conductive paste was 10 weight parts. Other conditions were the same as those of the example 1.

(Example 9) In an example 9, the average particle diameter of the Ni powder was 5 μm in the metal conductive paste for the base layer. The amount of Ni was 5 wt % in the metal conductive paste for the base layer on a presumption that the amount of Cu was 100 wt %. The amount of glass in the metal conductive paste was 10 weight parts. Other conditions were the same as those of the example 1.

(Comparative example 1) In a comparative example 1, Ni powder was not added to the metal conductive paste for the base layer. Other conditions were the same as those of the example 1.

(Comparative example 2) In a comparative example 2, Ni powder was not added to the metal conductive paste for the base layer. The amount of glass in the metal conductive paste was 15 weight parts. Other conditions were the same as those of the example 1.

(Cu diffusion length) For the examples 1 to 9 and the comparative examples 1 and 2, the diffusion length of Cu from the base layer to the internal electrode layer was measured. The diffusion length of Cu was measured using an SEM (Scanning Electron Microscope) and an EDS (Energy Dispersive x-ray Spectroscopy). The results are shown in Table 1.

(Crack generation rate) The crack generation rate was measured for the examples 1 to 9 and the comparative examples 1 and 2. For the examples 1 to 9 and the comparative examples 1 and 2, the ratio of the number of samples in which the crack was generated was measured with respect to each 100 samples. When the crack was generated, it was judged to be rejected "x", and if no crack was generated, it was judged to be passed "0". The results are shown in Table 1.

(Fusion occurrence rate) The fusion occurrence rate was measured for the examples 1 to 9 and the comparative examples 1 and 2. For the examples 1 to 9 and the comparative examples 1 and 2, the ratio of the number of samples in which fusion occurred was measured with respect to each 2000 samples. When the fusion occurrence rate was 1.0% or more, it was judged as rejected "x", and when the fusion occurrence rate was 0.2% or more and less than 1.0%, it was judged as good "Δ". When the fusion occurrence rate was less than 0.2%, it was judged as very good "0". The results are shown in Table 1.

(Formation of oxides containing Ni and Zn in the base layer) For the examples 1 to 9 and the comparative examples 1 and 2, it was investigated whether an oxide containing Ni and Zn was formed in the base layer. Specifically, the presence or absence of oxides containing Ni and Zn was confirmed using the mapping image obtained by using EDS. By using the SEM image together, it was confirmed whether it was a metal component or an oxide component. When the area ratio of the oxide containing Ni and Zn was less than 0.5%, it was judged as rejected "x", and when it was 0.5% or more and less than 1.0%, it was good "Δ". When it was 1.0% or more, it was judged as very good "0". The results are shown in Table 1.

(Density) The density of the base layer was investigated for the examples 1 to 9 and the comparative examples 1 and 2. A SEM photograph was taken and binarized, and when the metal component and the glass component were less than 98%, it was judged as a reject "x". When the metal and the glass component were 98% or more and less than 99%, it was good "Δ". When the metal component and the glass component were 99% or more, it was judged to as very good "○". The results are shown in Table 1.

(Glass floating, defective in Ni-plating) For the examples 1 to 9 and the comparative examples 1 and 2, glass floating and defective in Ni-plating on the surface of the base layer were investigated. When the coverage of Ni-plating was less than 98%, it was judged as rejected "x". When the coverage of the Ni-plating was 98% or more and less than 100%, it was judged as good "Δ". When the coverage of the ni-plating was 100%, it was judged as be very good "○".

(Total evaluation) For the examples 1 to 9 and the comparative examples 1 and 2, when at least one of "crack generation rate", "fusion occurrence rate", "formation of oxide containing Ni and Zn in the base layer", "density", "glass floating and defective in Ni-plating" was judged as rejected "x", the total evaluation was judged as rejected "x". When "x" was not included and one or more of "Δ" was included, the total evaluation was judged as good "Δ". When all judges were "○", the total evaluation was judged as very good "○".

For the comparative example 1, the total evaluation was judged as rejected "x". It is considered that this was because the Cu diffusion length became large and the crack generation rate became large because Ni was not added to the base layer. The total evaluation of the comparative example 2 was judged as rejected "x". This is because the firing temperature had to be lowered in order to reduce the Cu diffusion length without adding Ni to the base layer, and therefore the amount of glass had to be increased. It is thought that this was because "fusion" and "glass floating and defective in Ni-plating" were rejected.

On the other hand, in the examples 1 to 9, the total evaluation was judged to as good "Δ" or very good "○". It is considered that this was because the Cu diffusion length could be reduced by including Ni in the base layer even if the firing temperature of the base layer was raised.

Compared with the example 4, in the examples 2 and 3, the results of "fusion occurrence rate" and "glass floating and defective with Ni plating" were better. It is considered that this is because the amount of glass added to the base layer is 10 weight parts or less. In the example 7, 13 weight parts of glass was added as in the example 4, but the fusion occurrence rate and the like were "○". This is because the glass supplemented the example 7 because the amount of Ni added was large and the density was slightly insufficient.

Compared with the example 5, the evaluation result of the density was improved in the examples 6 and 7. It is considered that this is because the amount of glass added to the base layer was 10 weight parts or more in the examples 6 and 7.

Compared with the example 9, the results of "fusion occurrence rate" and "formation of oxide containing Ni and Zn in the base layer" were improved in the example 8. This is because, in the example 8, since the Ni particles were fine, a large number of oxides containing Ni and Zn were formed more uniformly, and as a result, the amount of glass was apparently reduced and excess glass was not generated. It is considered that the occurrence of fusion was suppressed.

TABLE 1

|  | COMPARATIVE EXAMPLE | | EXAMPLE | | | | | | | | |
| --- | --- | --- | --- | --- | --- | --- | --- | --- | --- | --- | --- |
|  | 1 | 2 | 1 | 2 | 3 | 4 | 5 | 6 | 7 | 8 | 9 |
| Ni AMOUNT [, mass %] | 0 | 0 | 1 | 5 | 5 | 5 | 10 | 10 | 10 | 5 | 5 |
| Ni POWDER PARTICLE DIAMETER (μm) | — | — | 0.6 | 0.6 | 0.6 | 0.6 | 0.6 | 0.6 | 0.6 | 0.1 | 5 |
| Cu POWDER PARTICLE DIAMETER (μm) | 3 | 3 | 3 | 3 | 3 | 3 | 3 | 3 | 3 | 3 | 3 |
| GLASS (WEIGHT PARTS) | 7 | 15 | 7 | 7 | 10 | 13 | 7 | 10 | 13 | 10 | 10 |
| FIRING TEMPERATURE (° C.) | 800 | 760 | 800 | 800 | 800 | 800 | 800 | 800 | 800 | 800 | 800 |
| THICKNESS OF BASE LAYER (μm) | 25 | 25 | 25 | 25 | 25 | 25 | 25 | 25 | 25 | 25 | 25 |
| Cu DIFFUSION LENGTH [μm] | 9.2 | 3.8 | 4.6 | 2.8 | 2.4 | 2.6 | 0.4 | 0.3 | 0.6 | 2.7 | 2.1 |
| CRACK GENERATION RATE | X | ○ | ○ | ○ | ○ | ○ | ○ | ○ | ○ | ○ | ○ |
| FUSION OCCURRENCE RATE | X | X | ○ | ○ | ○ | Δ | ○ | ○ | ○ | ○ | Δ |
| Ni, Zn OXIDE | — | — | ○ | ○ | ○ | ○ | ○ | ○ | ○ | ○ | Δ |
| DENSITY | ○ | ○ | ○ | ○ | ○ | ○ | Δ | ○ | ○ | ○ | ○ |
| GLASS FLOATING, PLATING DIFFECTIVE | ○ | X | ○ | ○ | ○ | Δ | ○ | ○ | ○ | ○ | ○ |
| TOTAL EVALUATION | X | X | ○ | ○ | ○ | Δ | Δ | ○ | ○ | ○ | Δ |

Although the embodiments of the present invention have been described in detail, it is to be understood that the various change, substitutions, and alterations could be made hereto without departing from the spirit and scope of the invention.

What is claimed is:

1. A ceramic electronic component device:
a multilayer chip having a substantially rectangular parallelepiped shape and including dielectric layers and internal electrode layers that are alternately stacked, a main component of the dielectric layers being ceramic, a main component of the internal electrode layers being Ni, the internal electrode layers being alternately exposed to two end faces of the multilayer chip opposite to each other; and
external electrodes, each of which is provided on each of the two end faces,
wherein each of the external electrodes includes a base layer contacting the internal electrode layers, a main component of the base layer being Cu, and
wherein the base layer includes Ni of 1 wt % or more and 5.0 wt % or less on a presumption that an amount of Cu is 100 wt %.

2. The ceramic electronic device as claimed in claim 1, wherein the base layer includes an oxide including Ni and Zn.

3. The ceramic electronic device as claimed in claim 1, wherein an average grain diameter of the oxide including Ni and Zn is 1 μm or less, in the base layer.

4. The ceramic electronic device as claimed in claim 1, wherein the base layer includes a glass component of 7 weight parts or more and 13 weight parts or less with respect to Cu.

5. The ceramic electronic device as claimed in claim 1, wherein the base layer includes Ni of 3 wt % or more on a presumption that the amount of Cu is 100 wt %.

6. The ceramic electronic device as claimed in claim 1, wherein the base layer includes Ni of 5 wt % or more on a presumption that the amount of Cu is 100 wt %.

7. The ceramic electronic device as claimed in claim 1, wherein the base layer includes Ni of 7 wt % or less on a presumption that the amount of Cu is 100 wt %.

8. A manufacturing method of a ceramic electronic device comprising:
preparing a ceramic multilayer structure having a substantially rectangular parallelepiped shape in which dielectric green sheets including a main component ceramic and metal conductive pastes for internal electrode layers including Ni as a main component metal are alternately stacked, the metal conductive pastes being alternately exposed to two end faces of the ceramic multilayer structure opposite to each other;
forming a multilayer chip by firing the ceramic multilayer structure;
providing metal conductive pastes for base layers contacting the two end faces, a main component metal of the metal conductive paste for base layers being Cu powder, an amount of Ni powder of the metal conductive paste for base layers being 1 wt % or more and 5.0 wt % or less on a presumption that an amount of Cu is 100 wt %; and
firing the metal conductive pastes for base layers.

9. The method as claimed in claim 8, wherein a temperature of the firing of the metal conductive pastes for base layers is 780° C. or more and 860° C. or less.

10. The method as claimed in claim 8, wherein an average particle diameter of the Ni powder is 0.1 μm or more and 5 μm or less in the metal conductive pastes for the base layers.

11. The method as claimed in claim 8, wherein an average particle diameter of the Cu powder is 0.5 μm or more and 10 μm or less in the metal conductive pastes for the base layers.

12. The method as claimed in claim 8, wherein the amount of Ni powder of the metal conductive paste for base layers is 3 wt % or more on a presumption that the amount of Cu is 100 wt %.

13. The method as claimed in claim 8, wherein the amount of Ni powder of the metal conductive paste for base layers is 5 wt % or more on a presumption that the amount of Cu is 100 wt %.

14. The method as claimed in claim 8, wherein the amount of Ni powder of the metal conductive paste for base layers is 7 wt % or less on a presumption that the amount of Cu is 100 wt %.

15. A ceramic electronic component device:
a multilayer chip having a substantially rectangular parallelepiped shape and including dielectric layers and internal electrode layers that are alternately stacked, a main component of the dielectric layers being ceramic, a main component of the internal electrode layers being Ni, the internal electrode layers being alternately exposed to two end faces of the multilayer chip opposite to each other; and
external electrodes, each of which is provided on each of the two end faces,
wherein each of the external electrodes includes a base layer contacting the internal electrode layers, a main component of the base layer being Cu, and
wherein the base layer includes Ni of 1 wt % or more and 10 wt % or less on a presumption that an amount of Cu is 100 wt %, and the base layer includes an oxide including Ni and Zn.

16. The ceramic electronic device as claimed in claim 15, wherein an average grain diameter of the oxide including the Ni and the Zn is 1 μm or less, in the base layer.

17. A manufacturing method of a ceramic electronic device comprising:
preparing a ceramic multilayer structure having a substantially rectangular parallelepiped shape in which dielectric green sheets including a main component ceramic and metal conductive pastes for internal electrode layers including Ni as a main component metal are alternately stacked, the metal conductive pastes being alternately exposed to two end faces of the ceramic multilayer structure opposite to each other;
forming a multilayer chip by firing the ceramic multilayer structure;
providing metal conductive pastes for base layers contacting the two end faces, a main component metal of the metal conductive paste for base layers being Cu powder, an amount of Ni powder of the metal conductive paste for base layers being 1 wt % or more and 10 wt % or less on a presumption that an amount of Cu is 100 wt %; and
firing the metal conductive pastes for base layers;
wherein the base layer includes an oxide including Ni and Zn.

18. The ceramic electronic device as claimed in claim 17, wherein an average grain diameter of the oxide including the Ni and the Zn is 1 μm or less, in the base layer.

* * * * *